UNITED STATES PATENT OFFICE.

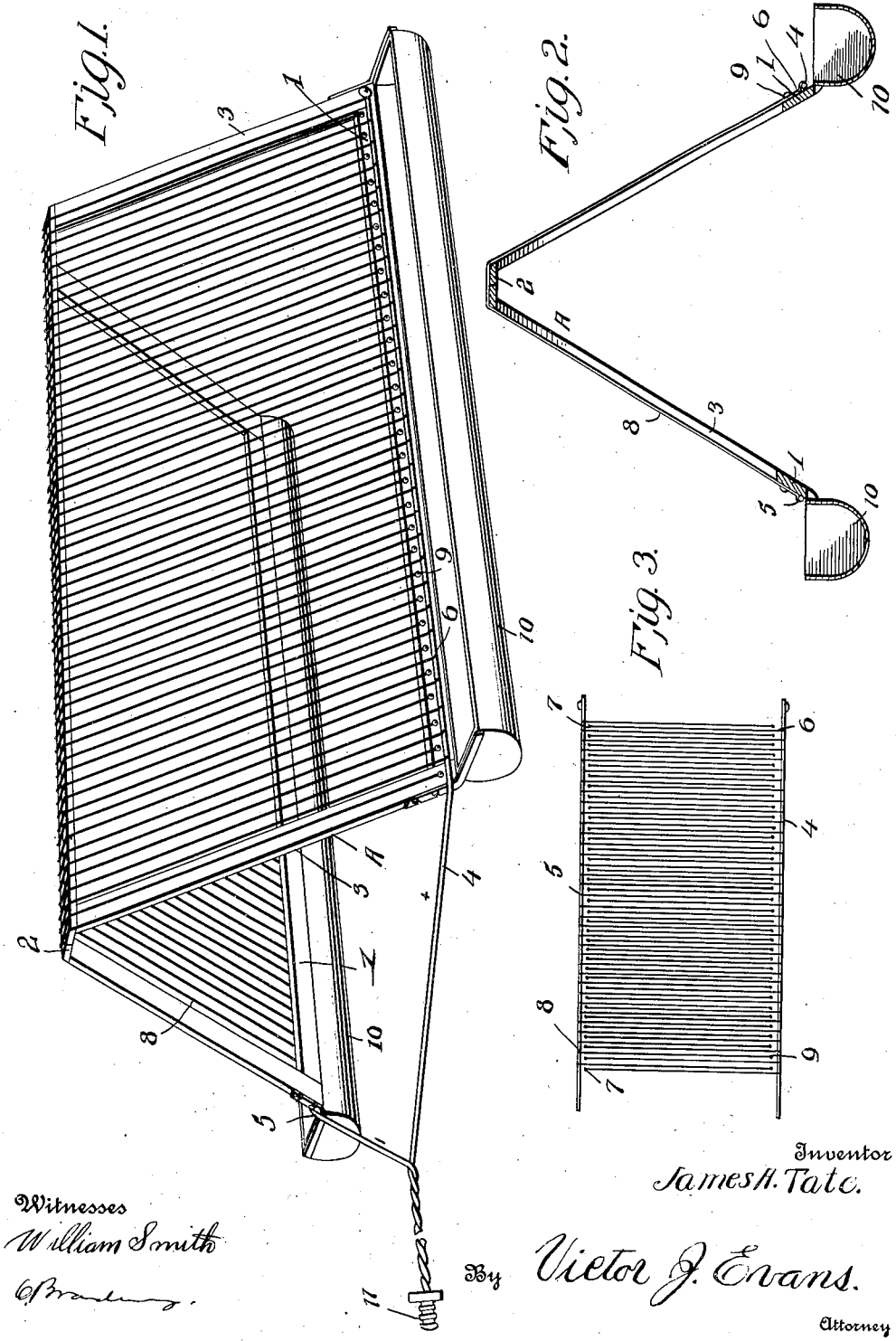

JAMES A. TATE, OF MONTICELLO, ARKANSAS.

ELECTRIC FLY-KILLER.

1,062,516. Specification of Letters Patent. Patented May 20, 1913.

Application filed January 25, 1911. Serial No. 604,610.

*To all whom it may concern:*

Be it known that I, JAMES A. TATE, a citizen of the United States, residing at Monticello, in the county of Drew and State of Arkansas, have invented new and useful Improvements in Electric Fly-Killers, of which the following is a specification.

This invention relates to an insect destroying device of that type including spaced wires normally in an open circuit and so arranged that when a fly or other insect comes in contact with two adjacent wires, a short circuit will be formed through the body of the fly for electrocuting the same.

The invention has for one of its objects to improve and simplify the construction and operation of devices of this character so as to be comparatively simple and inexpensive to manufacture and operate, and thoroughly reliable and efficient in use.

Another object of the invention is the provision of an insect killing device in the form of a sloping frame on which are stretched alternately arranged positive and negative wires and at the bottom of the frame is provided a trough into which the insects roll after they are killed by current passing through their bodies.

With such and other objects in view, the invention comprises the various novel features of construction and arrangement of parts which will be more fully described hereinafter and set forth with particularity in the claim appended hereto.

In the accompanying drawing, which illustrates one embodiment of the invention, Figure 1 is a perspective view of the device. Fig. 2 is a transverse section thereof. Fig. 3 is a diagrammatic view of the circuit wires.

Similar reference characters are employed to designate corresponding parts throughout the views.

Referring to the drawing, A designates a supporting structure consisting of oppositely-inclined frames presenting the appearance of a gable roof, each frame consisting of top and bottom horizontal bars 1 and 2 and vertical end bars 3. This frame can be suspended from the ceiling or other support, or mounted on legs, or supported on a table. Extending along the bottom bar 1 at one side of the structure is a positive wire 4, while extending along the other corresponding bar is a negative wire 5. The wire 4 has numerous branches 6 that extend upwardly on one frame to the ridge of the structure, and then downwardly to the bottom bar 1 of the other frame, where the free ends of the branches are anchored at 7. Branches 8 extend from the negative wire parallel to and alternating with branches 6 but spaced therefrom so that a fly or other insect alighting upon two adjacent wires will complete a circuit for current to flow, the current being of sufficient voltage to kill the fly. The free ends of the branches 8 are anchored at 9 in the rail 1 on which the positive wire is fastened. By arranging the frames in sloping relation, the device not only takes up less room but the electrocuted insects roll down the wires on the sloping frames and drop into troughs 10 extending along the bottom rails of the frames. These troughs are detachably mounted so that the victims can be emptied out when a sufficient number have accumulated. The wires 4 and 5 may be provided with an attaching plug 11 for connecting the device with a circuit including a suitable source of current.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention, what I claim as new, is:—

An electric fly killer including rectangular frames inclined upwardly and inwardly with relation to each other and connected at their upper ends, alternately disposed positive and negative wires extended from the base of one frame to the base of the other leading over the apex formed by the connected frames, and troughs connected to the base of each frame and forming supports for the structure.

In testimony whereof I affix my signature in presence of two witnesses.

JAMES A. TATE.

Witnesses:
　JACK CURRY,
　R. L. DEAL.